United States Patent Office 3,364,140
Patented Jan. 16, 1968

3,364,140
METHOD OF INHIBITING THE GROWTH OF ALGAE AND BACTERIA WITH AMIDINO-CARBAMATES
Donald Clifford Wehner, Fairfield, Conn., assignor to American Cyanamid Company, Stamford, Conn., a corporation of Maine
No Drawing. Filed Sept. 16, 1965, Ser. No. 487,892
9 Claims. (Cl. 210—64)

This invention relates to the control of microorganisms which cause problems in various environments, particularly industrial systems. In particular, the invention is directed to methods for controlling, arresting or eradicating algae, aerobic or anaerobic bacteria and other microorganisms which cause fouling of industrial process waters and disfigurement of inorganic and organic substrates.

The control of noxious growths in water systems and on various substrates is an acute problem, particularly in industrial systems depending on proces water. By "process water" is meant fresh water, slightly saline water, sea water, or concentrated brine, which are utilized in or result from various industrial treatments and which because of their source, mode of storage or utilization, operate as culture media for algae, bacteria and slime (the combination of such microorganisms with debris).

Typical industrial systems employing process water are paper mills, cooling towers used in connection with heat exchange systems, metallurgical operations employing cutting oils, latex paint preparation and storage, oil production including subsurface disposal of water withdrawn from wells and water used to repressurize wells for secondary oil recovery, packing fluids employed as "dead" layers in the casings of "multiple completion" oil well systems, and drilling mud systems. In general, any process water which remains quiescent or under reduced rate of flow is subject to growth of bacteria, particularly anaerobic bacteria, and algae if light is present.

The harmful effects of growth of these microbes, principally algae and bacteria, are enormous. In oil production, for example, the microbes cause injection well plugging and corrosion of iron and steel pipes and equipment necessitating excessive shut down for cleaning. In this environment, the sulfate reducing bacteria are particularly a nuisance. These bacteria are anaerobic, i.e., they can thrive in the absence of free oxygen, and are described as sulfate reducing since in their life metabolism they reduce the sulfate ion found in most waters to hydrogen sulfide. Moreover, these bacteria are resistant or develop resistance to many bacteriostatic and bactericidal agents. Frequently, sulfate reducing bacteria multiply so rapidly, particularly under moist, humid conditions and in a saline environment, that the concentration of known bactericides, e.g., chlorine required for control becomes so high as itself to cause corrosion of unprotected steel equipment.

The sulfate reducing bacteria generally include the species *Desulfovibrio desulfuricans, Desulfovibrio orientis, Clostridium nigrificans.* Of these, the first is most prevalent.

Using the oil as their carbon source, the bacteria reduce sulfate ion to hydrogen sulfide ("sour gas") which in turn reacts with iron to form black particles of suspended iron sulfide. These particles clog the injection system and the once water-permeable oil-bearing formations. The bacteria are often the sole cause of pitting type corrosion of drilling equipment, either by acting as cathode depolarizers or by producing corrosive hydrogen sulfide, but more often they accelerate corrosion.

Saline water, e.g., brine or sea water, is commonly employed in primary and secondary oil recovery and as a packing fluid in multiple completion oil wells, particularly in coastal areas. Saline water, however, greatly limits the choice of bactericidal agents effective against sulfate reducing bacteria since many of such agents, e.g., amines, quaternary compounds, imidazolines, precipitate out in salt solutions. Others, e.g., silver and mercury compounds, such as phenyl mercuric acetate, are precipitated by the sulfides resulting from the metabolism of the bacteria.

In paper mills, collection of "black spots" (iron sulfides produced by sulfate reducing bacteria) in the bottom of tanks or slow sections of lines can seriously lower the quality of the paper product. In metallurgical operations, shutdown of a plant over a weekend, for example, has permitted the growth of bacteria in cutting oil tanks, causing unbearable odors of hydrogen sulfide and loss of production time while the cutting oils are replaced and tanks cleaned.

In addition to the above environments, many inorganic and organic substrates are subject to fouling by algae and bacteria. For example, these microbes disfigure leather and paper goods and the surfaces of various plastic articles such as shower curtains and other like manufactured goods. Additionally, these microbes infect swimming pools and cause spoilage of packaged goods, particularly goods packed in plastics, wood and other cellulosics such as paper, cardboard, and the like. Likewise, bacterial pathogens are a problem in various agricultural situations.

Accordingly, a class of antimicrobial agents has been discovered which when applied to various organic and inorganic substrates such as described above or when incorporated in industrial process water or other water systems such as swimming pools, prevents the growth of damaging algae and bacteria or if such microbes are already present, kill or prevent further growth of said microbes. As a consequence, infested media show evidence of a marked improvement in stability and freedom from deterioration.

The antimicrobial agents of the invention are n-alkyl amidinocarbamates which may be represented by the structure:

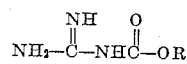

wherein R is a higher straight chain alkyl group. By "higher" alkyl is meant at least 8 carbon atoms. For most applications, 8–20 carbon atoms inclusive is the desired range, and preferably 10–16 carbon atoms, inclusive. The acid addition salts of these n-alkyl amidinocarbamates are also within the scope of the invention. These salts include the hydrochlorides, the sulfates and the carboxylic acid salts such as the acetates, as well as the equivalents thereof. In some applications, a particular salt will be preferred due to greater solubility and compatibility in a given system. For example, the sulfate salt demonstrates excellent compatibility with process waters containing sulfates and with cooling tower waters which generally contain chromate corrosion inhibitors.

The antimicrobial agents also include mixtures of the carbamates or their salts in which the compounds have been prepared from commercially available mixed n-alkanols having a range of carbon content sometimes predominating in a certain chain length, e.g., the "Lorol" series of alcohols predominating in n-dodecanol but also containing $C_8$, $C_{14}$ and $C_{16}$ alcohols, and the "Alfol" alcohols, e.g., mixtures of $C_8$ and $C_{10}$ alcohols, mixtures of $C_{12}$ and $C_{14}$ alcohols, mixtures of $C_{12}$, $C_{14}$ and $C_{16}$ alcohols, and mixtures of $C_{16}$ and $C_{18}$ alcohols. Also included are commercially available alcohol mixtures containing odd and/or even numbers of carbon atoms in the alcohol carbon chain, e.g., $C_{11}$ through $C_{15}$ alcohols. The compounds per se and method of preparation form no part of the present invention. See U.S. Patents 2,599,737 and 3,166,470.

The antimicrobial compounds of the invention not only provide the advantage of effectiveness in small quantities but are also inexpensive and relatively easy to prepare since the raw materials are readily available. The compounds are also light in color and provide a choice of solubilities which depend on chain length of the alkyl group and the salt-forming group, thus providing advantages for formulations where light color and control of solubility are important.

The antimicrobial agents may be employed singly, in mixtures of two or more, or with diluents, carriers, solvents or the like, either prior to or following infestation with the interfering microorganisms.

The amount of compound for effective control of organisms in process water or other environment will depend on the particular system. About 20 p.p.m. or less in the water of cooling towers will be effective. Oil well brines used in oil recovery require in the order of 25 p.p.m. or less. Neutral drilling muds are protected against growth of sulfate reducing bacteria by about 50 p.p.m. or less of one of the compounds. Amounts of 150 p.p.m. or less in cutting oils effectively prevent spoilage and offensive odors therein. Generally, the compounds are effective in quantities of the order of about 0.25 to 10,000 p.p.m.

The compounds of the invention may be added directly to the process water in any suitable tank. However, even though the maximum concentrations used are small, the volumes are large and uniform mixing is highly desirable. Direct addition, though simple, is not usually wholly satisfactory. Accordingly, the most useful mode of addition is to prepare a relatively smaller but more concentrated solution than the final dilution desired. This solution can then be metered by a proportioning pump or its equivalent into a suitable agitated tank or a flow of water as the latter is being pumped to the point of use. Normal turbulent flow in the conduit produces adequate mixing. In this way, accurate dosages can be supplied and uniform dilutions obtained.

If desired, any of the numerous well known inert diluents or additives may be employed with the antimicrobial agents provided they are compatible therewith. Suitable dispersions may be prepared by dissolving up to about 10% by weight of the compound based on the weight of the inert additive in a water-miscible solvent, e.g., lower alkanols, ethylene glycol monomethyl ether, dioxane, and the like, or a water immiscible solvent, e.g., a hydrocarbon solvent such as benzene or xylene or a halogenated hydrocarbon such as chlorobenzene, chloroform, fluorotrichloromethane, dichlorodifluoromethane and the like, and then emulsifying in water, employing if desired a surfactant such as sodium lauryl sulfate, aliphatic and aromatic sulfonates, e.g., sulfonated castor oil, or various alkaryl sulfonates, e.g., the sodium salt of mono sulfonated nonyl naphthalene. Non-ionic types of emulsifying agents such as the higher molecular weight alkyl polyglycol ethers and analogous thio ethers such as the decyl, dodecyl and tetradecyl polyglycol ethers and thio ethers containing from about 25 to 75 carbon atoms may be used. The concentration of surfactant in the final emulsion should be sufficient to make the oil and water phases readily dispersible. Usually, from 1 to 5 parts by weight of the surfactant per 100 parts of active agent is a satisfactory range although such porportion may be varied over a wide range depending upon the particular circumstances.

Adjuvants such as wetting agents or humectants may, if desired, be employed particularly when compounding an aqueous dispersion. Examples of humectants are glycerine, diethylene glycol, polyethylene glycol and the like.

The compounds are particularly effective at concentrations less than about 13 p.p.m. against growth of bacteria of the species Bacillus, Aerobactor, Pseudomonas, and Desulfovibrio; fungi of the species Pullularia, Aspergillus, Pencillium, Chaetomium, Myrothecium, Memnonellia, Fusarium, Lenzites, Lentinus, Poria, Certostomella, Spicaria, Trichoderma, and Philalophoria; and algae of the species Chlorella, Oscillatoria, Ankistrodesmus, Chlamydomonas, and Phormidium.

In keeping paper mill water systems free from slime and algae, concentrations of 25 p.p.m. or less will be employed. The use of about 20 p.p.m. or less will protect cooling towers and heat exchanger equipment carrying aqueous fluids from microbial growth of various origins which unchecked will cause corrosion and consequent loss of cooling capacity in the system. Addition of 0.1 to 1% of the compounds to coating materials, adhesive compositions, sizes, glue, caulking compounds, latex emulsions, starch solutions, and polymer systems such as polyacrylamide solutions will prevent discoloration and disfigurement of these materials by microbial degradation.

Incorporation of amounts ranging from about 0.05 to 1% in oleaginous liquids will render them mildew resistant and preserve them from degradation and deterioration by fungal activity while in storage. Quantities of the order of 25 p.p.m. or less of the compounds when added to oil well brines and the like will effectively control microbial growth which otherwise would cause plugging of pipe lines and corrosion of production equipment. A quantity in the order of 500 p.p.m. or less added to drilling muds will protect the starches and gums contained therein from algal and bacterial attack, particularly by sulfate reducing bacteria of the Desulfovibrio type, thus preventing corrosion and failure of oil well casing. The use of quantities of the order of 250 p.p.m. or less in a washing or spraying solution employed for treating packed fruits and vegetables will drastically reduce the number of fungi and bacteria present and improve the keeping quality and storage life of the produce.

In the field of plastic manufacture, addition of amounts of the order of 1% or less of the total composition will render the finished product mildew and algae resistant and thus prevent deterioration or disfigurement of the molded products such as shower curtains, bath mats and the like. Self-sanitizing paper, e.g., disposable diapers, are particularly benefited by the invention since when applied in a suitable solvent, the active agents penetrate the substrate rather than merely coat the surface as in prior art articles. Moreover, treatment of wood with the compound of the instant composition by spraying or soaking will retard subsequent rot of the wood evidenced by discoloration and weakness thereof. Further, the inclusion of amounts of 150 p.p.m. or less in cutting oils has been found to prevent spoilage and offensive odors in the liquid and improvement therein.

The compounds of the invention are particularly effective against algal growths of all species wherever they occur. For example, they are effective auxiliaries with chlorine in swimming pools where "black" algae thrive. This algal species is resistant to the maximum levels of chlorine generally permitted by public health regulations. Moreover, since algae are food for bacteria, control of algae by use of the amidinocarbamates prevents even the beginning of bacterial infestation, although the compounds are also effective against pre-existing bacteria as already described.

Formulations containing the active ingredient are generally applied to the infested material to be treated in the form of a liquid by spraying, e.g., aerosols, or as a vapor by fumigation in those cases where this is practical, e.g., space disinfecting of closets. In still other cases it may be applied in the solid state by dusting or other means. In situations where it is to be added to a material prior to final formulation or where it is added to a composition to preserve the material from further deterioration, it is simply added to the formulation prior to final mixing.

In the case of solid carriers, those familiar to the dusting art which are favored for their large surface area such as bentonite, kieselguhr, fullers earth, clay, pyrophylite, talc and the like, may be employed. Commercial clay carriers are generally acceptable as are nonclay carriers, like lignocellulose, wood flour and such. When solid compositions are employed, it is desirable that the composition be in finely divided form. Preferably the dust containing the active ingredient should be sufficiently fine that substantially all of the particles will pass through a U.S. Standard Sieve Series No. 200 Screen.

The range of proportions of inert carrier or diluent to the active ingredient is broad and is not considered to be critical. From about 0.01% to 2% by weight of the active ingredient has been found adequate for the preparation of most dispersions. In dry compositions up to about 5% active ingredient is suitable for most applications. It should be understood of course that the active ingredient may be employed by itself or in proportions of much higher concentration if it is desired to be dispensed by aerosol or other like means.

The following examples further illustrate the invention but are not limitative thereof except as indicated in the appended claims. All parts and percentages are by weight unless otherwise specified.

*Example 1*

Various dilutions of n-(mixed $C_{12}$, $C_{14}$)—amidinocarbamate sulfate were mixed with nutrient salt solutions containing 3 g. of $NH_4NO_3$, 1 g. of $K_2HPO_4$, 0.25 g. KCl and then inoculated with an actively growing culture of green algae (Chlorophyceae). The mixtures were then incubated in sunny areas of a greenhouse for from two to three weeks and examined. Control flasks containing none of the amidinocarbamate sulfate contained typical green algae growths but the flasks which contained 3.25 p.p.m. or more of the active ingredient showed no growth of algae.

*Example 2*

A culture of the blue-green algae Phormidium (the troublesome "Black" algae in swimming pools) was grown on Chu's mineral salts medium (J. of Ecology, 30, 284–325, 1942) utilizing natural daylight (north east exposure) and room temperature. Luxuriant growth was obtained within two weeks after inoculating with a 1% vol./vol. suspension of active Phormidium culture.

Toxicant dilutions of n-(mixed $C_{12}$, $C_{14}$) amidino carbamate sulfate were prepared in Chu's medium. Duplicate 125 ml. flasks containing 50 ml. of Chu's medium with toxicant dilution were set up at toxicant levels of 25, 12.5, 6.25, 3.1, 1.6, and 0.8 p.p.m. as well as appropriate control flasks containing no toxicant. The test flasks were inoculated with the active culture described above using a 1% vol./vol. of inoculum (agitation of the culture in a blender at low speed for a few moments breaks up long filaments and clumps and provides a more uniform suspension). After incubation as described above, the flasks were examined visually to determine the extent of algal multiplication. No algae were found in the toxicant dilutions above 3.5 p.p.m. However, in the 1.6 p.p.m., 0.8 p.p.m and control flasks, heavy growth of the algae was present

*Example 3*

A broth dilution test utilizing the 3 troublesome aerobic bacteria species *Aerobacter aerogenes, Bacillus mycoides* and *Pseudomonas aeruginosa* was set up. These bacteria are commonly found to be the cause of slime, decomposition and spoilage of or in industrial products and process waters. Each of these organisms was grown in test tube cultures utilizing a medium containing 1% "Bacto" peptone and 0.1% dextrose. Heavy growth of each is found after incubation at 30° C. for 24 hours. Toxicant dilutions of n-(mixed $C_{12}$, $C_{14}$) amidinocarbamate sulfate in the sterile medium described about were prepared containing 150, 75, 37.5, 22.5, 15, 7.5, 3.7 and 0.7 p.p.m. of toxicants in duplicate sets of test tubes for each organism. After inoculation of the test tubes with one drop of active culture per tube, the test tubes were incubated for 24 hours at 30° C. At the end of this period visible growth as evidenced by turbidity was noted in the control tubes and in the lower toxicant dilutions. Higher toxicant dilutions were clear and therefore indicated no growth of the test organisms. The following table reports lowest toxicant dilutions showing no growth of each species.

TABLE I

| Species: | No growth, p.p.m. |
|---|---|
| *Aerobacter aerogenes* | 7.5 |
| *Bacillus mycoides* | <0.7 |
| *Pseudomonas aeruginosa* | 7.5 |

*Example 4*

Further tests are conducted to determine the effectiveness of the n-alkyl amidinocarbamates against sulfate reducing bacteria. The tests are those developed by the American Petroleum Institute, Recommended Practice No. 38, as substantially indicative of the effectiveness of the toxicant were it used to control the growth of sulfate reducing bacteria in the waterfloods resulting from, or used in, secondary oil recovery. These tests are typical bacteriostatic broth dilution tests in which suitable dilutions of the toxicant are prepared and aliquots placed in bottles or test tubes. These containers together with suitable controls are then nearly filled with the A.P.I. recommended nutrient medium containing inoculum of test organism. The containers are then tightly stoppered to prevent entrance of oxygen and incubated for 21 days (in the case of Desulfovibrio) or 7 days (in the case of Clostridium). The test dilutions containing the latter species of bacteria are slight modifications of the A.P.I. recommended practice in that 1% peptone is added to the medium. Growth of the test organisms is evident by intense blackening caused by iron sulfide production of actively growing cultures. The lowest concentration of n-(mixed $C_{12}$, $C_{14}$)-amidinocarbamate sulfate which inhibited the growth of these organisms was found to be 12.5 p.p.m. (*Desulfovibrio desulfuricans*) and 20 p.p.m. (Clostridium).

I claim:

1. A method of inhibiting the growth of algae and bacteria which comprises contacting said algae and bacteria with a minor but effective amount of a compound selected from the group consisting of an n-alkyl amidinocarbamate of the structure:

$$NH_2-\overset{\overset{\displaystyle NH}{\|}}{C}-NH\overset{\overset{\displaystyle O}{\|}}{C}-OR$$

wherein R is higher, straight chain alkyl, and the acid addition salts thereof.

2. The method of claim 1 wherein said n-alkyl amidinocarbamate compound contains 8–20 carbon atoms in the alkyl group.

3. The method of claim 1 wherein said n-alkyl amidinocarbamate compound contains 12–14 carbon atoms in the alkyl group.

4. A method for the protection of organic materials susceptible to attack by algae and bacteria which comprises applying to said organic material a minor but effective amount of a compound selected from the group consisting of an n-alkyl amidinocarbamate of the structure:

$$NH_2-\overset{\overset{\displaystyle NH}{\|}}{C}-NH\overset{\overset{\displaystyle O}{\|}}{C}-OR$$

wherein R is higher, straight chain alkyl, and the acid addition salts thereof.

5. The method of claim 4 wherein said n-alkyl amidinocarbamate compound contains 8–20 carbon atoms in the alkyl group.

6. The method of claim 4 wherein said n-alkyl amidinocarbamate compound contains 12–14 carbon atoms in the alkyl group.

7. A method of treating industrial process water to inhibit the growth of algae and bacteria therein which comprises providing in said process water an effective amount of a compound selected from the group consisting of an n-alkyl amidinocarbamate of the structure:

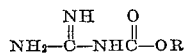

wherein R is higher, straight chain alkyl, and the acid addition salts thereof.

8. The method of claim 7 wherein said n-alkyl amidinocarbamate compound contains 8–20 carbon atoms in the alkyl group.

9. The method of claim 7 wherein said n-alkyl amidinocarbamate compound contains 12–14 carbon atoms in the alkyl group.

References Cited

UNITED STATES PATENTS 3,166,470  1/1965  Nagy _____ 167—22

MICHAEL E. ROGERS, *Primary Examiner.*